United States Patent [19]

Baldwin

[11] 4,199,793
[45] Apr. 22, 1980

[54] DIGITAL RECORDING

[75] Inventor: John L. E. Baldwin, Croydon, England

[73] Assignee: Independent Broadcasting Authority, London, England

[21] Appl. No.: 888,863

[22] Filed: Mar. 22, 1978

[30] Foreign Application Priority Data

Mar. 24, 1977 [GB] United Kingdom ............... 12391/77

[51] Int. Cl.² .................... G11B 5/09; G11B 19/24; G11B 15/60
[52] U.S. Cl. ........................ 360/78; 360/47; 360/73; 360/84; 360/130.21
[58] Field of Search ................... 360/75–78, 360/84, 107, 130, 90, 47, 130.2–130.23, 73

[56] References Cited

U.S. PATENT DOCUMENTS

| 2,539,837 | 1/1951 | Howell | 360/84 |
|---|---|---|---|
| 3,095,473 | 6/1963 | Roizen | 360/84 |
| 3,123,272 | 3/1964 | Pollaschek | 360/130 |
| 3,152,223 | 10/1964 | Wessels | 360/107 |
| 3,157,738 | 11/1964 | Okamura | 360/84 |
| 3,281,804 | 10/1966 | Dirks | 360/47 |
| 3,293,627 | 12/1966 | Auyang et al. | 360/77 |
| 3,303,482 | 2/1967 | Jenkins | 360/47 |
| 3,375,331 | 3/1968 | Okazaki et al. | 360/107 |
| 3,376,383 | 4/1968 | Felix | 360/107 |
| 3,495,047 | 2/1970 | Atsumi et al. | 360/47 |
| 3,721,773 | 3/1973 | Kluge | 360/107 |
| 3,761,903 | 9/1973 | Bird, Jr. et al. | 360/47 |
| 3,964,094 | 6/1976 | Hart | 360/77 |

FOREIGN PATENT DOCUMENTS 650997 3/1951 United Kingdom.

*Primary Examiner*—Alfred H. Eddleman
*Attorney, Agent, or Firm*—Lawrence E. Laubscher

[57] ABSTRACT

A magnetic tape recording and reproducing apparatus has a head assembly comprising a plurality of transducing heads, and guide means arranged so that the heads are spaced apart by a distance which is great enough so that only one head is affected by a blemish or dust speck on the tape but yet gives an ability to follow tracks on the tape which are closely packed. The guide means and the heads are disposed so that when the tape is transported across the heads, the heads follow paths which are parallel to the edges of the tape and each head is in contact with a position of the tape spaced apart in the direction of movement of the tape. In one embodiment, the heads are horizontally disposed and the tape is guided over the heads at an acute angle to the horizontal. In another embodiment, the heads form part of an annulus and the tape is wound helically round a support drum.

7 Claims, 10 Drawing Figures

DIGITAL RECORDING

BRIEF DESCRIPTION OF THE PRIOR ART

The present invention relates to apparatus for recording information on and/or reproducing information from a magnetic member.

The information is recorded in the form of digital signals and it is convenient to describe the present invention in relation to its use for digital signals derived from an analogue signal, such as an audio and/or video signal. For some purposes the audio or video signals will advantageously be converted to digital form before recording and after playback converted back into an analogue signal.

Digital apparatus has already made an impact on broadcast systems usually as part of what is still essentially an analogue system. Already, digital techniques are being used for time-base correction in video tape recorders.

A tape recorder to record a video signal in digital form would require a high total bit-rate, of the order of 80 to 120 Megabit/sec for a 625 line PAL colour signal sampled at 2 or 3 times sub-carrier frequency. This assumes 8 bit pulse code modulation (PCM) to carry the information and a ninth bit for error detection purposes.

It is desirable that the use of digital techniques should not result in an increase of tape consumption compared to that of analogue recorders. A reasonable consumption would be about 12 square inches of tape per second. For a bit density along a track of 30 kilobits per inch about 220 tracks per inch would be required for a total bit density of 80 Megabits per 12 square inches. A centre-to-centre spacing between tracks of about 4.5 thousandths of an inch is therefore required. A track width of 0.003 inch with a guard band of 0.0015 inch would be appropriate. It has been found that a track width of 0.003 inch is more than sufficient to give an adequate signal-to-noise ratio for satisfactory operation with binary digital signals. In fact, the track width could be of the order of 0.0005 inch if the head could be made to follow the track accurately.

It is also desirable to have at least several heads in contact with the tape simultaneously since the effect of an isolated blemish or speck of dust which may lift the tape from operative contact with one head will result in only a small fraction of the data being lost at any time. This makes error correction more practical. To obtain this advantage, an isolated blemish or speck of dust should not be able to lift the tape from operative contact with more than one head at any time. An isolated blemish or dust speck is unlikely to lift an area of more than 0.1 inch diameter from operative contact with heads; this diameter is a function of the tape tension and the geometry of the heads. It is desirable therefore that heads should be separated by not less than about 0.1 inch but sometimes a compromise has to be reached due to other conflicting requirements.

Conventional multi-track high density recorders have a plurality of heads in a head stack with a separation which is often less than desirable between heads in each head stack. In spite of the proximity of the heads, the conventional recorders would require about 15 head stacks for a one inch wide tape in order to achieve the necessary total bit rate. Typically each head stack occupies about one inch along the tape which not only would result in a large recorder but considerable problems would arise in guiding the tape over such a large number of head stacks.

SUMMARY OF THE INVENTION

The purpose of this invention is to overcome or at least mitigate these problems, and the present invention provides magnetic tape recording and playback apparatus, comprising a transducer head assembly and guide means for guiding the tape as it passes the head assembly, the head assembly being provided with a plurality of transducer heads and the head assembly and guide means being arranged so that the tape is moved over the head assembly in such a manner that each head contacts a portion of the tape spaced apart in the direction of movement of the tape.

In a preferred embodiment, there are at least three heads and preferably more with each head being spaced from adjacent heads by at least 0.039 inch. Further, a plurality of head assemblies are combined such that each head assembly is spaced from the next in a direction generally transverse to the direction of movement of the tape.

BRIEF DESCRIPTION OF THE DRAWING

Features and advantages of the present invention will become apparent from the following description of embodiments thereof, given by way of example, when taken in conjunction with the accompanying drawings, in which.

DETAILED DESCRIPTION

Figure 1:
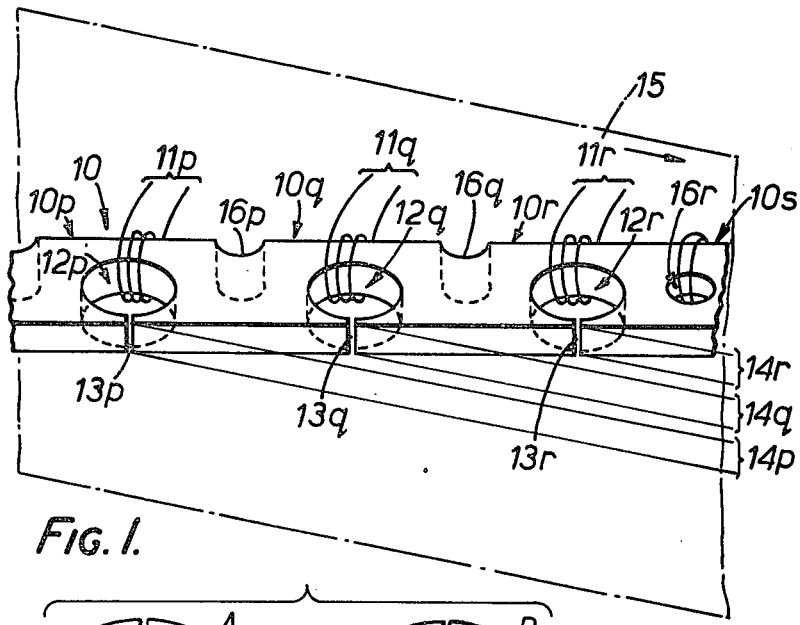
FIG. 1 shows a part of a linear array of magnetic recording/playback heads and the form that the information is recorded on a magnetic tape.

Turning now to the drawings, FIG. 1 shows a part of a head assembly suitable for either recording on or playing back tracks 14p, 14q, 14r on a magnetic tape 15 shown in phantom and moving in the direction indicated by the arrow it is assumed that recording is occurring. The assembly generally indicated by the reference numeral 10 comprises a plurality of heads 12p, 12q, 12r arranged in a linear array and constituted by sections 10p, 10q, 10r, 10s of a single member made of a ferromagnetic material, for example ferrite. Each section 10p, 10q, 10r, 10s comprises two spaced apart portions. One end of each space between portions forms a head gap 13p, 13q, 13r respectively and is arranged to be adjacent the tape 15 while the other end of each space between portions is bridged by a winding 11p, 11q or 11r. In a record mode, currents are caused to flow in one direction or the other through the windings 11p, 11q, 11r causing magnetic fields adjacent to the gaps 13p, 13q, 13r which magnetize the tape, laying down tracks 14p, 14q, 14r on the moving tape 15; the direction of flow of current in any one winding depending, at any time, on whether a 'one' or a 'zero' is to be recorded on that track at that time, this controls the direction of magnetization. In a replay mode, the changes of flux on the moving tape cause changes of flux through the windings inducing signals in the windings 11p, 11q, 11r, the polarity of the signal depending on whether the flux on the tape changes from that representing a 'one' to that representing a 'zero' or vice versa. Depending on the magnetic characteristics of the parts 10p, 10q, 10r, 10s and on their geometry it may be desirable to introduce slots such as 16p to minimize crosstalk between heads. The effect of such slots may be improved by inserting a good electrical conductor through them; an alternative solution is to form a loop of a good conductor through a hole as at 16r. The head gaps are at least 0.039 inch apart, and preferably 0.1 inch apart, and the angle of the tape with respect to the heads ensures that a guard band of 0.0015 inch is provided.

Figure 2:
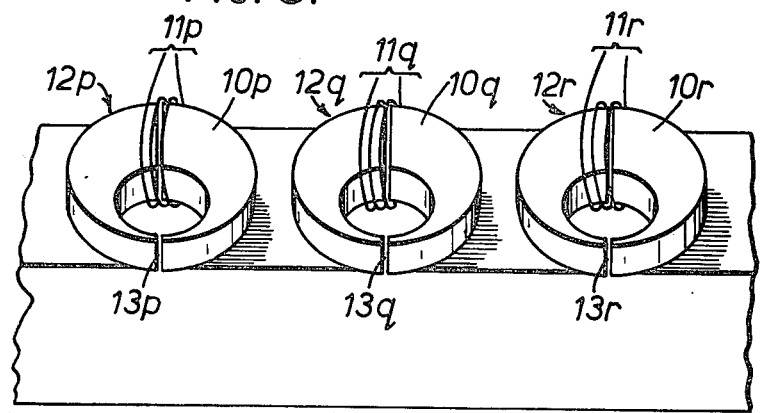
FIG. 2 shows a variation on the realization of the array.

FIG. 2 shows an alternative method of producing a linear array by mounting individual heads on a flat surface. Like reference numerals are used for like parts. It will be realized, by those skilled in the art, that for a strictly linear array additional means, not shown, will be required to guide and transport the tape and to keep it in operative contact with the heads; this last requirement could be met say by pressure pads or differential air pressure. The head assembly could also be in the form of an annulus for use with rotating drum type of recording and playback apparatus.

Figure 3:
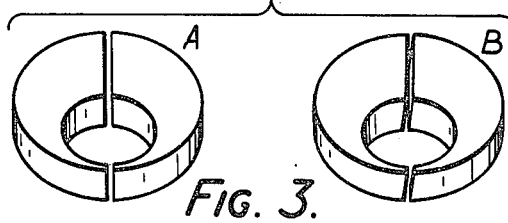
FIG. 3 shows how the azimuth may be altered.

As represented in FIG. 1, the tape 15 and the head assembly are at an angle to each other so that each head is adjacent a different section of tape, the angle determining the spacing between tracks. It is usual to arrange that the normal to the plane of the head gap should be parallel to the length of the track. Since the tape and heads are at an angle to each other, this may be required for some applications of the present embodiments. This may be realized as shown in FIG. 3. The angle of rotation from that previously described (shown at A) is easily calculable, relatively small and is unlikely to exceed 10 degrees. It should be realized that this change can be incorporated also in the apparatus, yet to be described, in the other figures.

Figure 4:
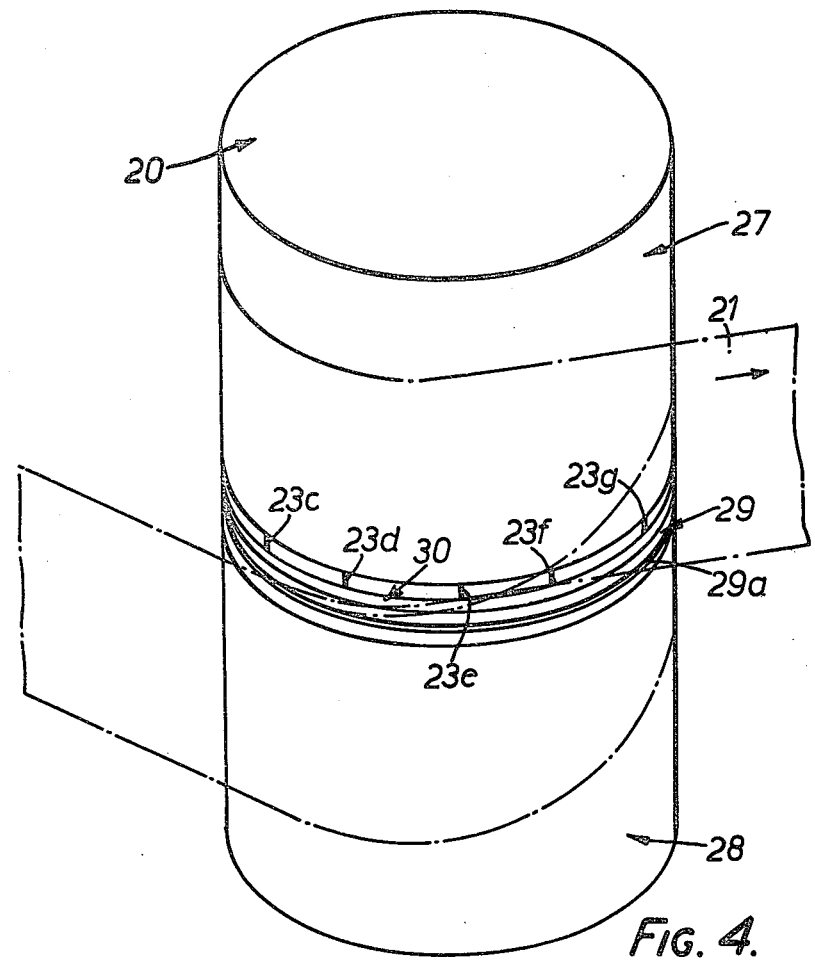
FIG. 4 shows an erase and recording/playback assembly used in conjunction with a magnetic tape which follows a helical path.

FIG. 4 shows part of a particular embodiment of a tape recorder in which the head assembly is included in a drum 20, the magnetic tape 21 indicated in broken lines being would round it in the form of a helix. The drum 20 is constructed from two hollow cylindrical parts 27 and 28, the junction between the parts forming an opening receiving an annular head assembly. The construction of the drum will not be described in more detail as it is conventional and well known to those skilled in the art. The head assembly is held stationary. As shown, the tape winds slightly more than one turn round the drum but it is obvious that this is not necessary since it can be arranged that the recording and playback heads, such as 23c, 23d, 23e, 23f, 23g, etc., do not appear all the way round the periphery of the drum. In order to prevent the tape from sticking to the drum, under static conditions, it may be desirable to have a microscopically rough surface for parts 27 and 28, or preferably to float the tape over the drum on a very thin air cushion. This may be achieved by introducing air under pressure at appropriate positions around the top of part 28 and additionally near bottom of part 27.

The head assembly further comprises an erase head 29 consisting of a ferrite ring with an external slot 29a containing a winding is mounted close to but below the record/playback heads and separated therefrom by a non-magnetic spacer 30.

Figure 5:
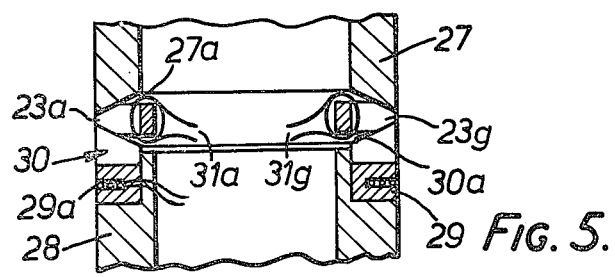
FIG. 5 shows a cross-section of such an assembly.

FIG. 5 shows part of the cross-section of the drum 20 shown in FIG. 4. The bottom 27a of the upper part 27 may advantageously be slightly concave or conical and the top 30a of the spacer 30 can be similarly shaped. These individually or collectively increase the thickness of the magnetic circuit compared to that of the pole-tips 34 resulting in greater strength and lower losses. Also shown are the windings 31g, 31a of two of the record/playback heads 23g, 23a respectively, the erase head 29 and the lower cylinder 28.

Figure 6:
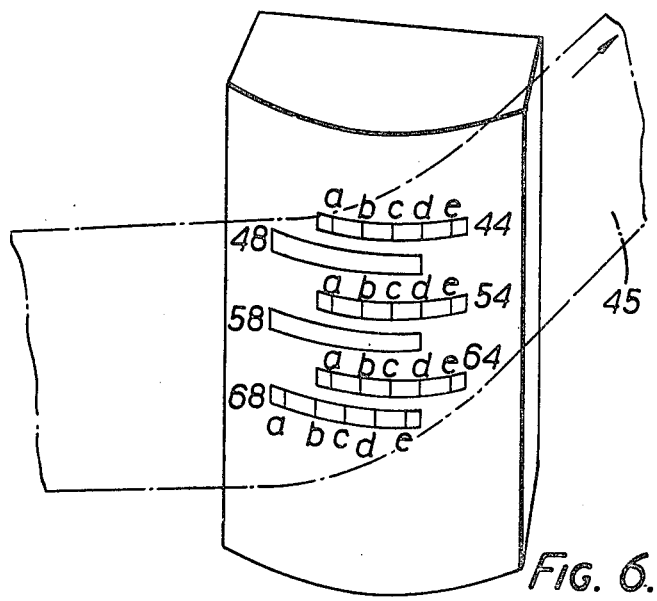
FIG. 6 shows a two-dimensional record/playback assembly incorporating erase.

FIG. 6 shows a head stack comprising a two dimensional array of heads which is an alternative to the arrangement shown in FIGS. 4 and 5 and in which 44a,b,c, d and e, 54a,b,c,d and e and 64a,b,c,d and e are each one dimensional linear arrays constructed as previously described in relation to FIGS. 1, 2 and 3. Erase heads 48, 58 and 68 are disposed such that they wipe the area of tape to be used for recording by heads 44, 54 and 64 respectively. In this case, the tape 45 is arranged to traverse the head stack at an angle to the linear arrays of heads. Hence, the erase heads are vertically and horizontally displaced from the record and playback heads. Different arrangements are used depending on the disposition of the tape viz a viz the record/playback heads. The erase heads 48 and 58 are shown as being a single head but it is possible for each erase head to be constituted by an array of erase heads for individually erasing tracks to be re-recorded by the record heads of an array. This is indicated for the erase head 68 which comprises an array of erase heads 68a,b,c,d,e. This may be useful to only erase a digital sound signal when, for example, it requires to be replaced by one in a different language. At other times all the tracks containing the digital video signal may need to be replaced when, for example, a microphone appears inadvertently in the picture; the picture could perhaps be replaced by that shot from a different camera position. It will be obvious to those skilled in the art how the record/replay and erase heads should be split up depending on, for example, how a particular recorder is likely to be used, the bit rate requirement of each sound channel and the bit rate capability of each track. It may often prove advantageous to split a sound channel, for example, between a plurality of tracks, greater than that apparently necessary, in order to achieve satisfactory error correction or concealment.

The path of the tape 45 slants such that each head records tracks which are substantially equi-spaced from one another.

Figure 7:
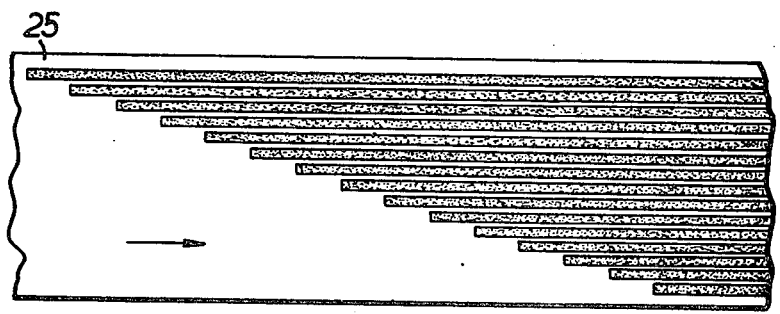
FIGS. 7 and 8 show the form of the signal recorded on the magnetic tape.
Figure 8:
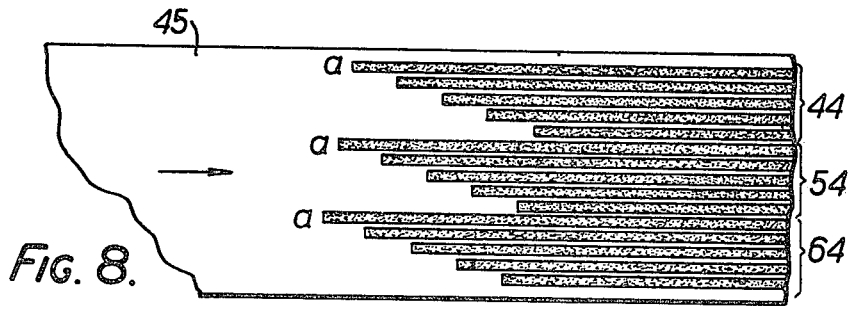

FIG. 7 shows the form of the signal recorded on the magnetic tape (as viewed through the tape base) using the head assembly shown in FIG. 4, whereas FIG. 8 shows the form resulting from the head assembly illustrated in FIG. 6. The positions of the left hand boundaries of the recorded tracks show where the recording has reached at a specific time. From this it can be seen that corresponding times on the several tracks are adequately separated positionally so that an isolated blemish or speck of dust cannot remove the tape from operative contact with more than one head at any time; this simplifies the problem of error detection and correction.

As was mentioned previously, it is desired to record about 220 tracks per inch width of track. Theoretically, this is possible in a single pass of tape past the recording/playback heads while still having the heads physically spaced apart by a suitable amount but the apparatus tends to be bulky and it is not thought at present to be practicable except perhaps for the drum-type recorder.

A more practical solution is to use a continuous loop of tape of a convenient length and to record only a portion of the 220 tracks in a single pass thereby necessitating multiple passes of tape in order to record 220 tracks per inch width. Apparatus constructed to carry out this approach is shown in FIG. 9 and a cartridge for storing the tape is shown in FIG. 10.

Figure 9:
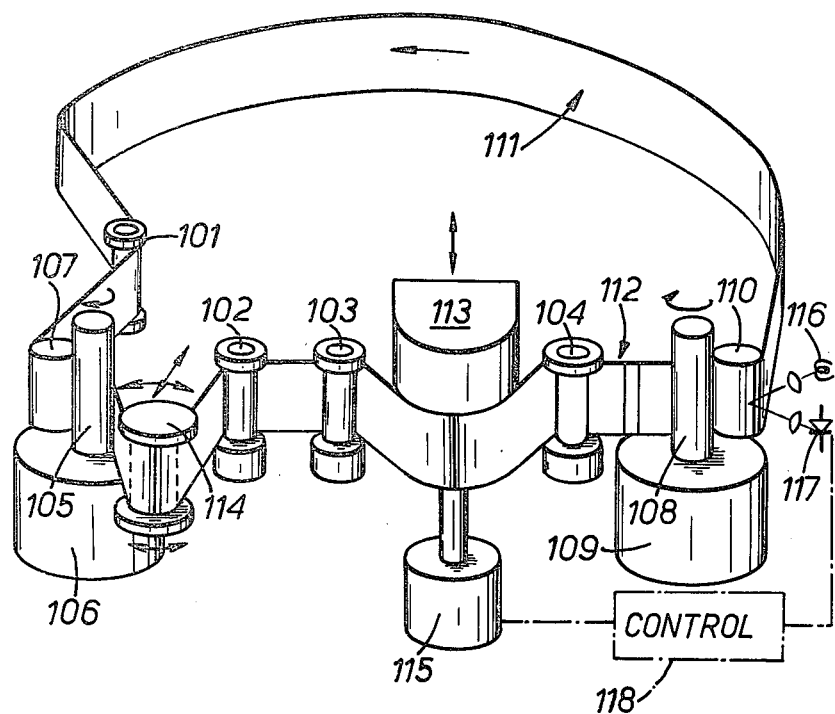
FIG. 9 shows diagrammatically a part of a tape recorder according to the present invention.
Figure 10:
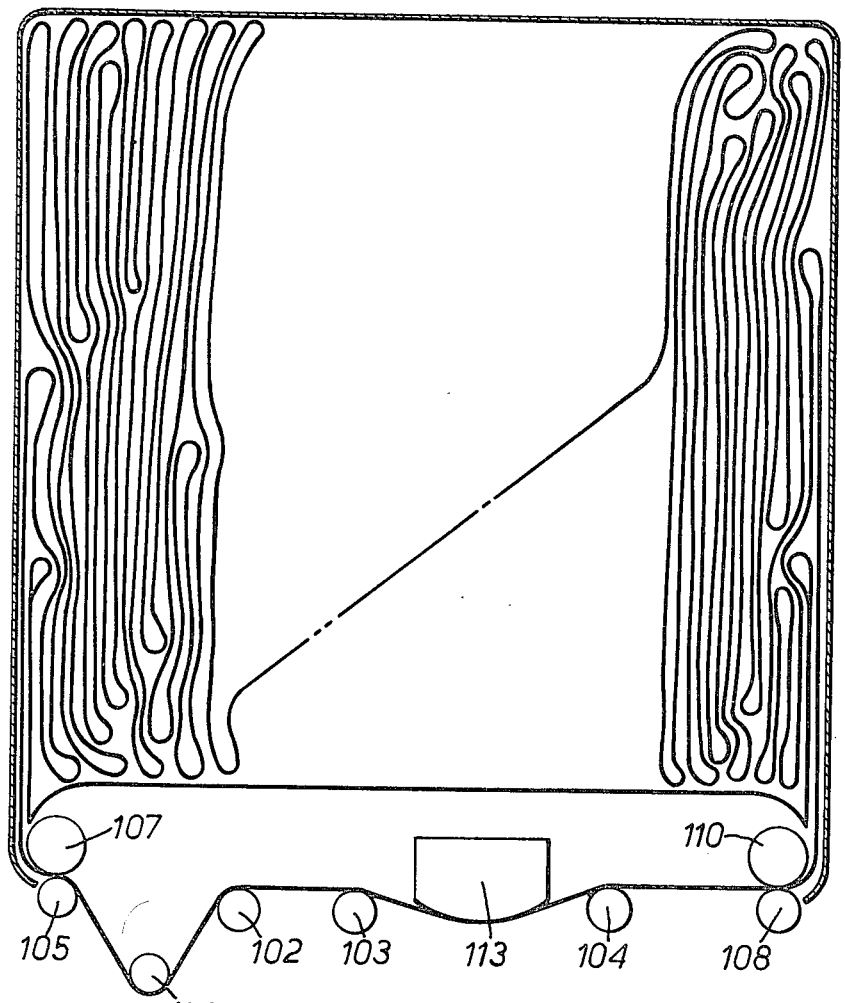
FIG. 10 shows diagrammatically one way of storing magnetic tape.

FIG. 9 shows a part of a high density video tape recorder. A loop of magnetic tape 111 is guided past a head stack 113 by tape guides 101, 102, 103 and 104. These latter three are intended to give precision guidance to the lower edge of the tape the upper part of each guide being spring loaded downwards. The tape may be guided across the head stack in the same manner as described with reference to FIG. 1 or 6. Alternatively the plane containing the centres of the heads may be tilted to separate one track from another. During the record mode the tape 111 is pulled past the record/replay head stack 113 at constant speed by means of a take-up capstan 108 driven by a motor 109, a pinch wheel 110 keeping the tape pressed tightly against the capstan.

A jockey roller 114 monitors the tape tension adjacent to it for controlling the speed of a motor 106 which drives a feed capstan 105. A pinch wheel 107 keeps the tape pressed tightly against this capstan. The jockey roller 114 in addition to moving in and out in response to tape tension changes may also move vertically and the bearings may rotate on gimbals to permit the tape to be constrained substantially kinematically by the guides 102 and 103.

The head stack 113 contains 16 heads each laying down a track which it is of the order of 0.0008 inch (20μ) with a guard band of 0.0002 inch (5μ) between tracks. Each time the splicing tape 112, which is aluminized, passes a sensing station, light from a light emitting device in the form of a lamp 116 is reflected on to a light detecting means in the form of a photo-sensor 117. A signal is generated when the photo-sensor 117 detects the reflected light and this signal is fed to a control circuit 118 for controlling operation of a head stack drive motor 115. When the motor 115 is started the head stack is moved by a distance equal to the width of tape already recorded, in this case by nominally 0.016 inch. For a 1 inch tape this is repeated over 60 times before the upper edge of the tape is reached.

If 10 bits per word are used then 252 of the 256 combinations which occur with 8 bit words may be chosen so that every 10 bit word has five 'ones' and of course five 'zeroes.' When an analogue video signal is sampled at twice PAL subcarrier frequency, one track is left unused and the bit-rate per track is approximately 6 Mbit/s becoming 5 Mbit/s if the line blanking interval is not recorded. At 120 inch per second tape speed the bit density is 50 or 41 kilo-bits/inch respectively.

The use of the code mentioned above is particularly advantageous in that the low frequency components of the recorded signal are severely restricted. This minimizes the inter-track cross-talk which should be about 30 dB down on the wanted signal. This is adequate for binary signals. On the unused track, which should be near the centre of the group of 16, say track 8, a timing and tracking reference is recorded. This may be a line frequency, 15625 Hz sine wave. This will cross-talk severely into the adjacent tracks 7 and 9 but since this frequency does not overlap the signal spectrum it may be removed by filtering. For tracking purposes however its amplitude on tracks 7 and 9 may be compared and depending on the sign of this comparison motor 115 may be rotated in the appropriate direction to equalise the cross-talk. Tracking will then be optimum. In order to achieve a more rapid initial pull-in to the correct position the level of this cross-talk could be summed for heads 1 to 7 and compared with the sum for heads 9 to 15.

Having obtained correct tracking the recorded timing reference is now available from track 8. This may be compared with a reference produced from a local horizontal synchronizing signal in a phase comparator. The output of this phase comparison is used to control the speed of rotation of motor 109 causing the tape to move at the correct speed. Additional signals such as the field and individual line from which the signals arise can be recorded on track eight and these may be used to progressively alter the phase of the reference until complete synchronization is achieved.

The path traced by each head is parallel to the edges of the tape for the major portion of the length of the path with an angled transitional portion for the next pass of the loop of tape past the heads. As an alternative, the paths could be at a small angle to the edges of the tape whereby the paths are helical and there is no transitional portion.

FIG. 10 shows in principle one way of storing the magnetic tape; this particular solution also allows winding backwards. The tape material, the surface finish and the other materials used must be chosen with care to minimize friction and in particular to avoid static charges. A loop of 600 feet will take 1 minute to pass once past the magnetic heads and just over the hour before it is fully recorded. By forcing motor 115 to rapidly rotate and thus move the head stack rapidly any part of the recording may be accessed in a maximum of about one minute. This is significantly faster than conventional recorders which can take about four minutes.

What is claimed is:

1. A magnetic tape recording and reproducing apparatus, comprising
 (a) a transducer head assembly including an array of transducer heads;
 (b) a loop of magnetic tape;
 (c) drive means for transporting said magnetic tape past said head assembly in a first direction, said transducer head assembly being mounted for movement in a second direction generally transverse to said first direction;
 (d) guide means for guiding the magnetic tape past said head assembly, said guide means being disposed relative to the array of heads to guide the tape at an acute angle past the heads and to cause said transducer heads to simultaneously engage respective portions of the magnetic tape that are spaced apart in said first direction of movement of the tape and that are spaced apart in said second direction transverse to said first direction of movement, whereby a separate track is traced by each head simultaneously on the tape and each track is substantially parallel to the edges of the tape for at least a portion of the length of the track;

(e) means for causing non-rotational relative movement between said head assembly and said tape in said second direction;

(f) means for supplying data to be recorded to said array of transducer heads; and (g) means for supplying a tracking control signal to one of said transducer heads for recording a tracking control signal on a track that is arranged between a pair of tracks.

2. Apparatus according to claim 1, wherein said loop of magnetic tape is provided with means for indicating when one complete pass of the tape has been made; and further wherein said means for causing non-rotational relative movement comprises a drive motor connected with said head assembly for transversely moving the head assembly, and further including means for sensing said indicating means on the tape, and means controlling operation of said drive means in response to said sensing means.

3. Apparatus acording to claim 1, wherein the transducer head assembly comprises a plurality of sets of transducer heads, each set comprising a plurality of heads spaced apart generally in the direction of movement of the tape, the sets being spaced apart in a direction transverse to the direction of movement of the tape.

4. Apparatus as defined in claim 1, and further including detecting means connected with the transducer head which is replaying the track containing the tracking control signal, said detecting means being connected to said drive means for transporting said loop of tape and being arranged to control the speed of tape transport in response to detection of said tracking control signal.

5. Apparatus according to claim 4, and further including additional detecting means connected with the transducer heads on either side of that transducer head which is replaying the track containing the tracking control signal, said detecting means being arranged to detect cross-talk signals from the track containing the tracking control signal and comprising means for detecting the amplitude of the cross-talk signals in each of the tracks on either side of the track containing the tracking control signal, means for comparing the amplitudes of the cross-talk signals and for producing a control signal, and means for supplying said control signal to said means for causing non-rotational relative movement for optimizing the tracking of the head assembly.

6. Apparatus as defined in claim 1, wherein the transducer heads are linearly disposed generally in said first direction and the guide means are disposed on either side of the head assembly for guiding the tape of the assembly at an acute angle relative to the line of the heads.

7. Apparatus as defined in claim 1, wherein the transducer heads form part of a stationary annular head assembly located on the periphery of a drum member, the tape being wound round the drum member in a helical manner.

* * * * *